United States Patent
Dang

(10) Patent No.: US 9,347,578 B2
(45) Date of Patent: May 24, 2016

(54) CHECK VALVE ASSEMBLY

(71) Applicant: Parker-Hannifin Corporation, Cleveland, OH (US)

(72) Inventor: Thang Quoc Dang, Huntington Beach, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 182 days.

(21) Appl. No.: 14/073,390

(22) Filed: Nov. 6, 2013

(65) Prior Publication Data

US 2014/0124065 A1 May 8, 2014

Related U.S. Application Data

(60) Provisional application No. 61/723,961, filed on Nov. 8, 2012.

(51) Int. Cl.
*F16K 27/02* (2006.01)
*F16K 15/06* (2006.01)

(52) U.S. Cl.
CPC ........... *F16K 27/0209* (2013.01); *F16K 15/063* (2013.01); *Y10T 137/7904* (2015.04)

(58) Field of Classification Search
CPC ..... Y10T 16/39; Y10T 13/088; Y10T 13/075; Y10T 16/063; Y10T 16/05; F16K 15/06
USPC ........ 137/535, 540, 543.15, 528, 854, 315.33
See application file for complete search history.

(56) References Cited

U.S. PATENT DOCUMENTS

| | | | | | |
|---|---|---|---|---|---|
| 2,318,773 | A | * | 5/1943 | Goetz | 137/533.27 |
| 3,779,276 | A | * | 12/1973 | King, Sr. | 137/512.4 |
| 3,949,780 | A | * | 4/1976 | Buckman | 137/854 |
| 4,084,609 | A | * | 4/1978 | Johnson | 137/327 |
| 4,677,447 | A | * | 6/1987 | Nielsen | 347/87 |
| 4,750,314 | A | * | 6/1988 | Mietz et al. | 53/470 |
| 4,815,705 | A | * | 3/1989 | Kasugai et al. | 251/356 |
| 5,027,784 | A | * | 7/1991 | Osawa et al. | 123/572 |
| 5,345,965 | A | * | 9/1994 | Blume | 137/533.25 |
| 5,931,352 | A | * | 8/1999 | Dirr | 222/212 |
| 6,283,147 | B1 | * | 9/2001 | Rosseel | 137/512.15 |
| 6,408,872 | B1 | * | 6/2002 | Skeens et al. | 137/512.15 |
| 6,516,829 | B1 | * | 2/2003 | Townsend et al. | 137/517 |
| 6,889,707 | B2 | * | 5/2005 | Nicolino | 137/513.5 |
| 7,185,671 | B2 | | 3/2007 | Duex | |
| 8,083,332 | B2 | * | 12/2011 | Price et al. | 347/84 |
| 2012/0042969 | A1 | * | 2/2012 | Davidson | 137/535 |
| 2015/0104341 | A1 | * | 4/2015 | Ruh et al. | 417/440 |

\* cited by examiner

*Primary Examiner* — Craig Schneider
*Assistant Examiner* — Daniel P Donegan
(74) *Attorney, Agent, or Firm* — Renner, Otto, Boisselle & Sklar, LLP

(57) ABSTRACT

Provided is a check valve assembly including a check valve having a body and a stem having at least one radially inwardly deflectable member having an end with a radially outwardly projecting catch, and a valve shield retained on the stem between the body and the end of the at least one radially inwardly deflectable member by the radially outwardly projecting catch. In this way, a mechanical bond is provided between the check valve and the valve shield, thereby eliminating the need to clean the body of the check valve to remove contaminants to allow an adhesive to hold the check valve to the valve shield.

20 Claims, 5 Drawing Sheets

CHECK VALVE ASSEMBLY

RELATED APPLICATIONS

This application claims the benefit of U.S. Provisional Application No. 61/723,961 filed Nov. 8, 2012, which is hereby incorporated herein by reference.

FIELD OF INVENTION

The present invention relates generally to valves, and more particularly to check valves for pumps.

BACKGROUND

Pumps, such as high pressure pumps, may be used in high pressure applications and may be close coupled or belt driven. Each pump includes a manifold that may be machined from a solid billet of titanium so as to be resistant to corrosion, for example from seawater. Because the manifolds are machined and not cast, voids or casting defects are avoided. The pumps include nylon face valves and titanium backing rings for quiet operation and corrosion resistance, and inlet and discharge valve assemblies that are interchangeable for maintenance purposes.

SUMMARY OF INVENTION

The present invention provides a check valve assembly including a check valve having a body and a stem having at least one radially inwardly deflectable member having an end with a radially outwardly projecting catch, and a valve shield retained on the stem between the body and the end of the at least one radially inwardly deflectable member by the radially outwardly projecting catch. In this way, a mechanical bond is provided between the check valve and the valve shield, thereby eliminating the need to clean the body of the check valve to remove contaminants to allow an adhesive to hold the check valve to the valve shield.

According to one aspect of the invention a check valve assembly is provided that includes a check valve having a body having a first side configured to abut a valve seat and a second side, and a stem projecting from the second side of the body and having at least two circumferentially spaced members, at least one of which is a radially inwardly deflectable member having a distal end having a radially outwardly projecting catch, and a valve shield having a first side for abutting the second side of the body, a second side configured to serve as a seat for a resilient member, and an opening configured to surround the stem, wherein the valve shield is configured to be retained on the stem between the second side of the body and the distal end of the at least one radially inwardly deflectable member by the radially outwardly projecting catch.

In an embodiment, the valve shield does not extend beyond the distal end of the radially inwardly deflectable member.

In another embodiment, the valve shield does not extend beyond the radially outwardly projecting catch.

In still another embodiment, the valve shield includes a first portion that abuts the second side of the body and a second portion projecting from the first portion along the stem defining the opening.

In a further embodiment, the stem is cylindrical and the at least two circumferentially spaced members are curved.

In yet another embodiment, the check valve is made of nylon and the valve shield is made of metal.

In another embodiment, the valve shield is made of titanium.

In still another embodiment, the stem is segmented longitudinally into the at least two circumferentially spaced members.

In a further embodiment, the stem includes an unsegmented portion and a segmented portion formed by the at least two circumferentially spaced fingers.

In yet another embodiment, the radially inwardly deflectable member is urged radially inwardly by the valve shield until the valve shied moves to a position allowing the radially outwardly projecting catch to snap radially outwardly to hold the shield between the second side of the body and the distal end of the at least one radially inwardly deflectable member.

In another embodiment, the stem includes at least two radially inwardly deflectable members.

In still another embodiment, the stem includes at least three radially inwardly deflectable members.

According to another aspect of the invention, a valve assembly is provided that includes a valve housing with a passage, a check valve assembly in the passage, the check valve assembly including a check valve having a body having a first side and a second side configured to abut a valve seat in the housing and a stem projecting from the first side of the body, the stem having at least two circumferentially spaced members, at least one of which is a radially inwardly deflectable member having a distal end having a radially outwardly projecting catch, and a valve shield having an opening surrounding the stem and being be retained on the stem between the first side of the body and the distal end of the at least one radially inwardly deflectable member by the radially outwardly projecting catch, and a resilient member having a first end seated on the valve shield and a second end seated on a surface opposite the valve shield.

In an embodiment, the valve assembly further includes a valve plug for closing the passage.

In another embodiment, the second end of the resilient member is seated on the valve plug.

In still another embodiment, the valve plug has a body and a check valve guiding member projecting from the body, and wherein the check valve body is telescopically movable relative to the check valve guiding member.

In a further embodiment, the check valve guiding member is received in a cavity in the stem.

In yet another embodiment the valve assembly further includes a seal that seals between the valve housing and the valve plug.

According to still another aspect of the invention, a valve assembly is provided that includes a valve having a side and a stem circumscribing a central axis, the stem extending from the side of the valve and being segmented longitudinally into a plurality of separate prongs, at least one of the prongs having a narrow first end at a base and a radially broader end remote from the base forming a ridge protruding radially outwardly from the axis of the stem, and a valve shield having a central aperture received about the stem and being retained between the ridge of the prongs and the side of the valve.

In an embodiment, the valve shield does not extend beyond the radially broader end of the prong.

The foregoing and other features of the invention are hereinafter described in greater detail with reference to the accompanying drawings.

DETAILED DESCRIPTION

The principles of the present application have particular application to check valve assemblies provided in manifolds of reciprocating pumps and thus will be described below chiefly in this context. It will of course be appreciated, and also understood, that principles of the invention may be applicable to other valve assemblies where it is desirable to provide a spring seat for a resilient member.

Figure 1:
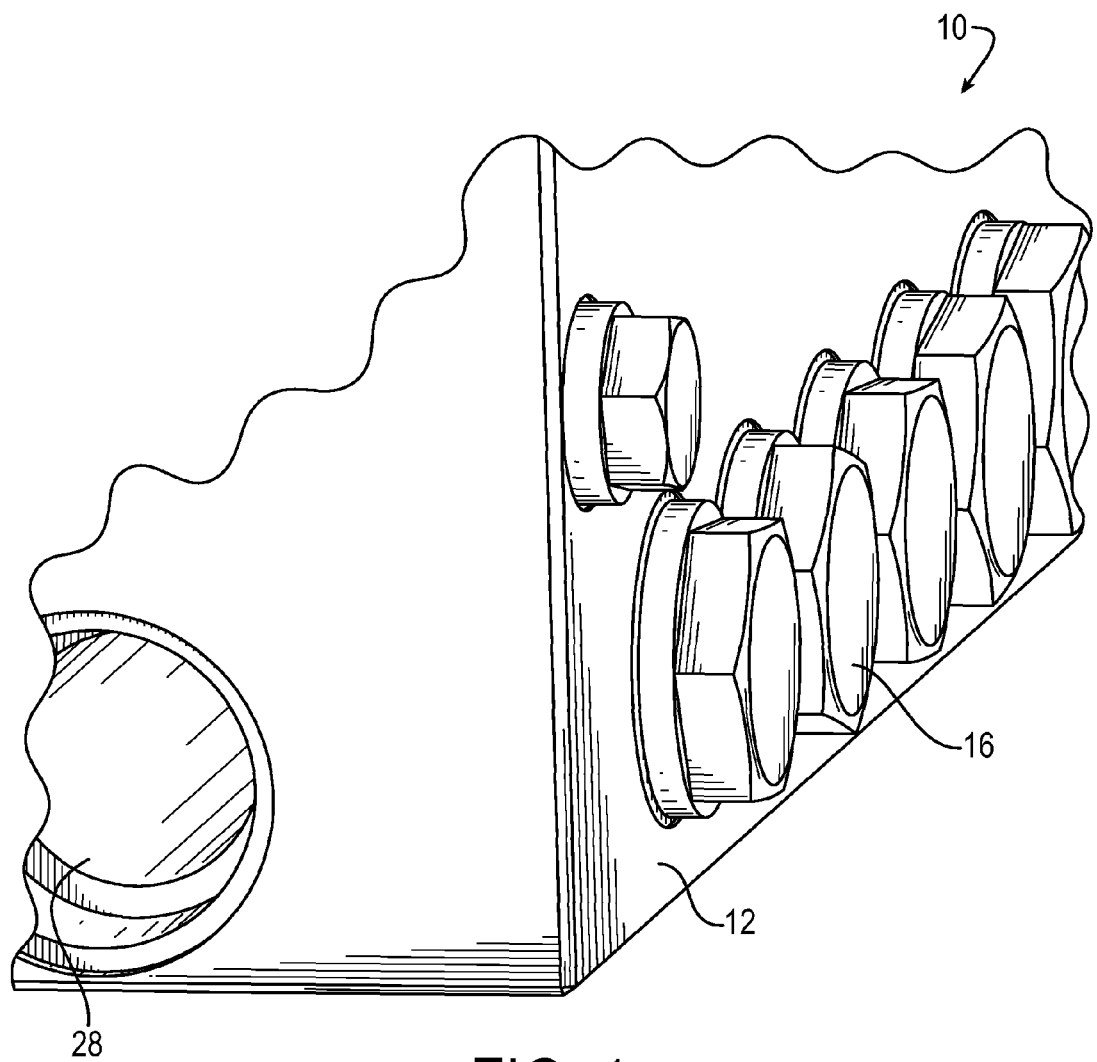
FIG. 1 is a partial perspective view of a manifold of a pump having a plurality of passages for receiving valve assemblies.
Figure 2:
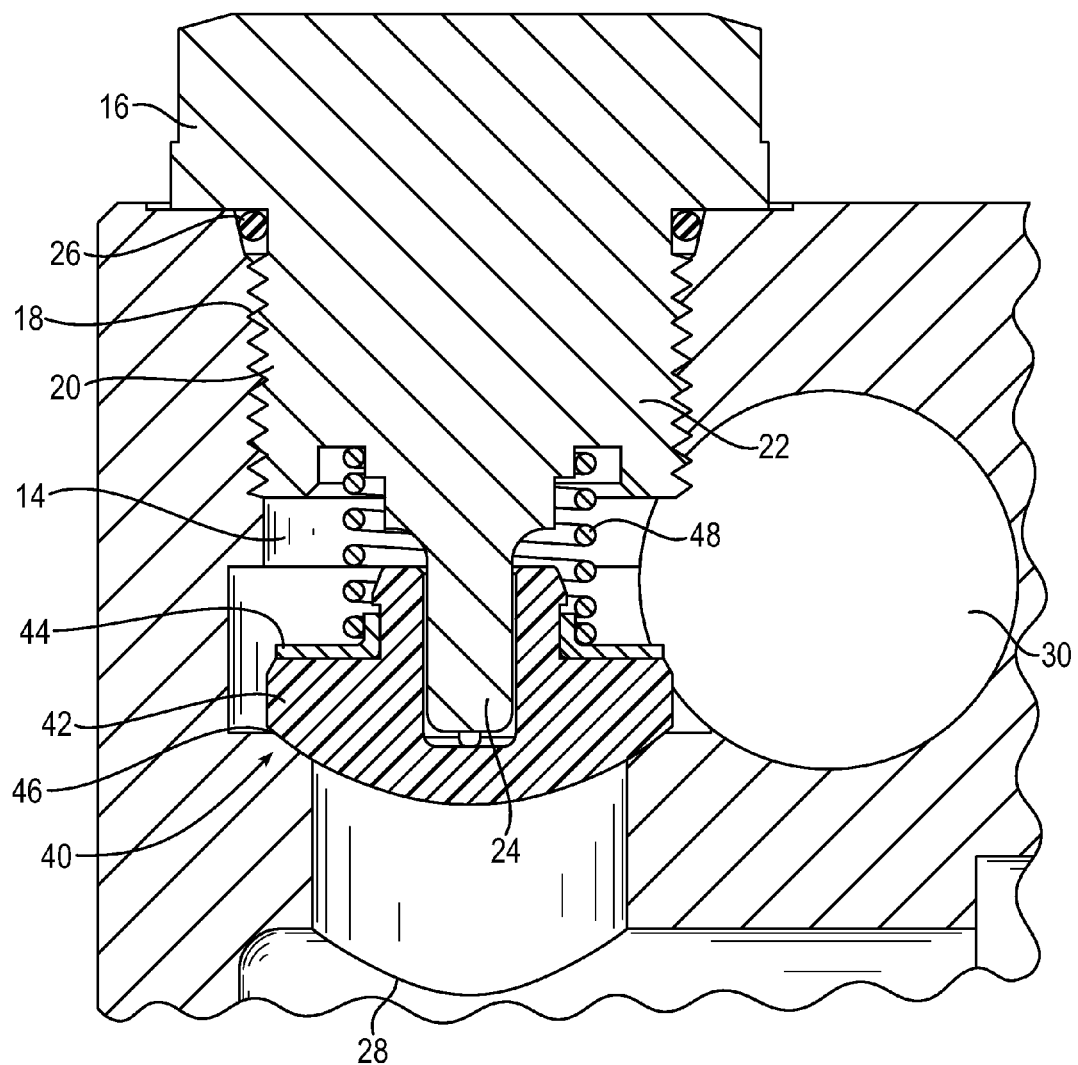
FIG. 2 is a cross-sectional view of the manifold.
Figure 3:
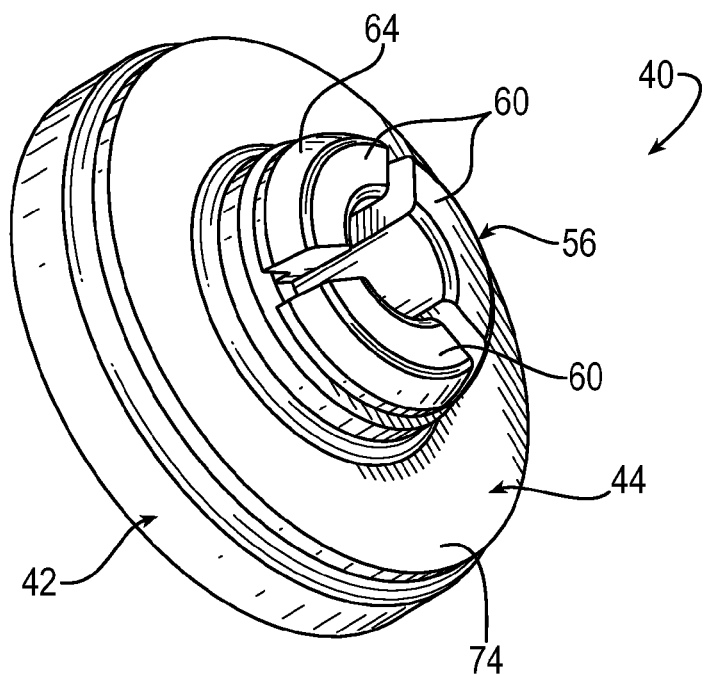
FIG. 3 is a perspective view of an exemplary check valve assembly according to the invention.
Figure 4:
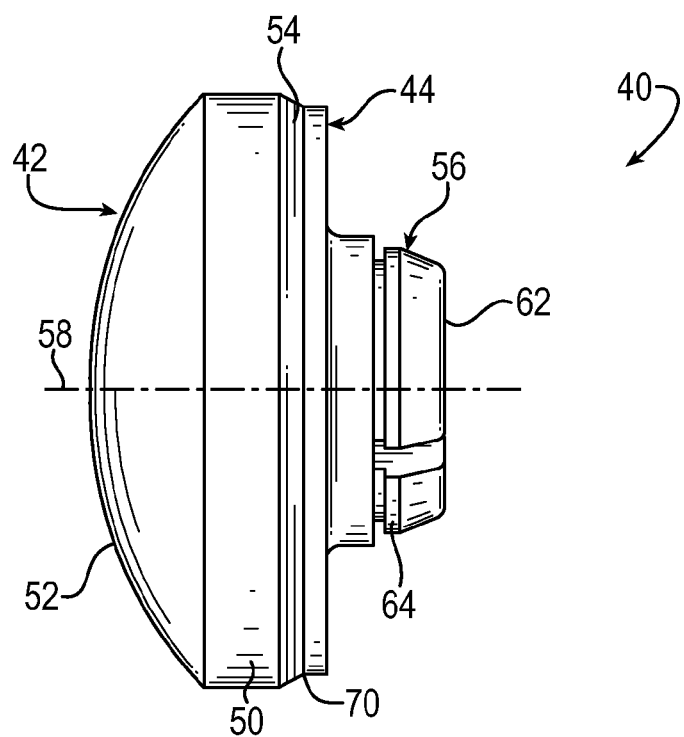
FIG. 4 is a side view of the exemplary check valve assembly.
Figure 5:
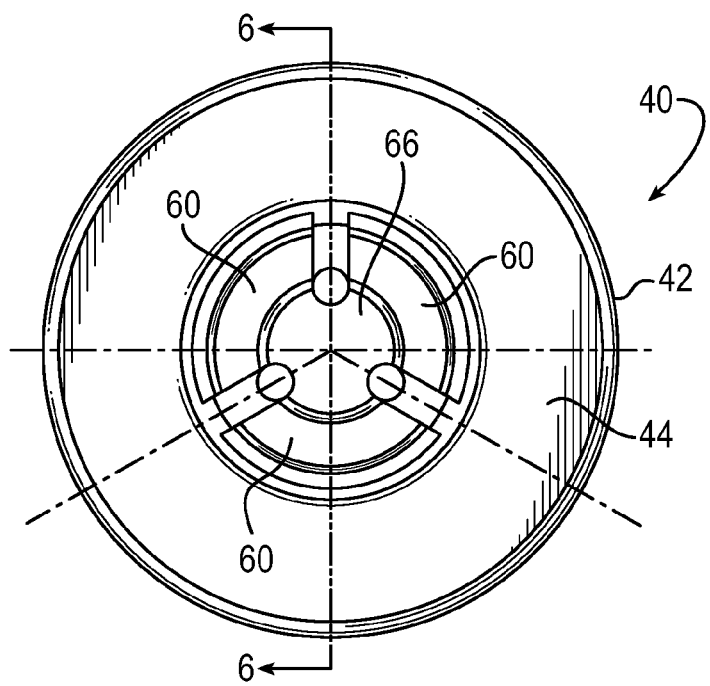
FIG. 5 is a front view of the exemplary check valve assembly.
Figure 6:
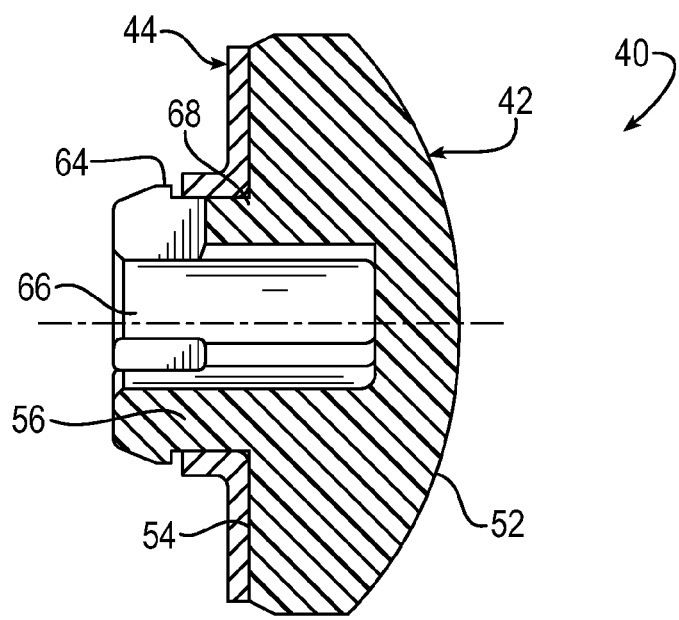
FIG. 6 is a cross-sectional view of the exemplary check valve assembly taken about line 6-6 in FIG. 5.
Figure 7:
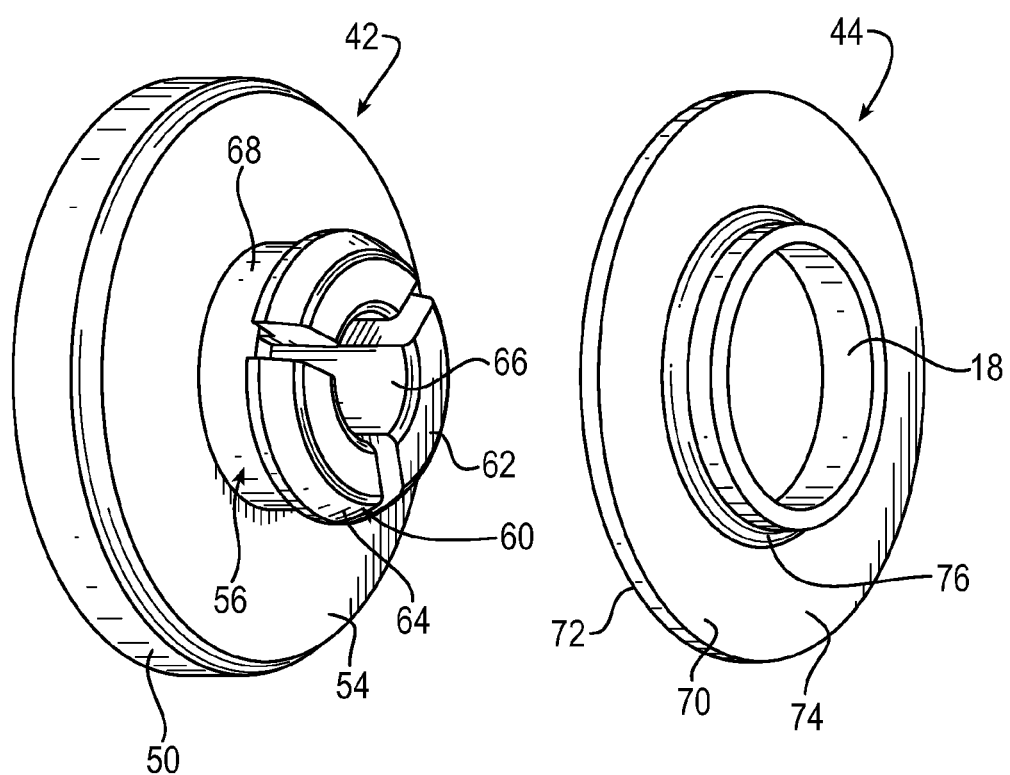
FIG. 7 is a perspective view of a check valve and valve shied of the check valve assembly.

Turning now to FIGS. 1 and 2, a portion of a reciprocating pump is shown generally at reference numeral 10. The reciprocating pump 10 includes a manifold 12 having a valve housing that includes a plurality of passages 14 open to an exterior of the manifold 12. The passages 14 may be closed by respective valve plugs 16 having threads 18 that mate with threads 20 in the respective passages 14. Each valve plug 16 may include a body 22 and a check valve guiding member 24 projecting from the body 22, and may be sealed to the manifold 12 in any suitable manner, such as by a suitable seal, such as by o-ring 26.

Fluid flows from a common passage 28 into the passages 14 and then to passages 30 in communication with the passages 14. A check valve assembly 40 may be provided in each passage 14 to prevent flow from the passages 30 to the common passage 28. For example, each check valve assembly 40 is telescopically movable relative to the check valve guiding member 24 from a first position preventing fluid flow from the respective passage 30 to the passage 28 to a second position allowing fluid flow from the passage 28 to the respective passage 30.

Each check valve assembly 40 includes a check valve 42 and a valve shield 44 that may be coupled to the check valve 42 as will be described in detail below. Each check valve assembly 40 is disposed in one of the passages 14 and seated on a respective valve seat 46 in the passage 14. Resilient members 48, such as springs, are provided to bias the check valve assemblies 40 in their first position. Each resilient member 48 has one end seated on one of the valve shields 44 and another end seated on a surface opposite the respective check valve assembly 40, such as on the respective valve plug 16. For example, the resilient member 48 may be seated on the body 22 of the valve plug 16 and surround the check valve guiding member 24.

Referring now to FIGS. 3-7, the check valve assembly 40 will be discussed in detail. As discussed above, the check valve assembly 40 includes a check valve 42 and a valve shield 44. The check valve 42 has a body 50 having a backside 52 that abuts the valve seat 46, a front side 54, and a stem 56 projecting from the front side 54 of the body 50, and in particular the stem 56 circumscribes a central axis 58.

The stem 56 has at least two circumferentially spaced members 60, at least one of which is a radially inwardly deflectable member having a distal end 62 having a radially outwardly projecting catch 64. As illustrated, the stem 56 includes three circumferentially spaced members 60 that are radially inwardly deflectable. The stem forms a cavity 66 into which the check valve guiding member 24 of the valve plug 16 is received when the valve assembly is assembled. The stem 56 may be made of any suitable material, such as nylon, and may be any suitable shape, such as a cylindrical shape wherein the circumferentially spaced members 60 are curved around the axis 58.

The stem 56 includes an unsegmented portion 68 and a segmented portion formed by the plurality of radially inwardly deflectable members or separate prongs 60. In other words, the stem 56 is segmented longitudinally into a plurality of separate prongs 60, at least one of the prongs 60 having a narrow first end at a base and a radially broader end remote from the base forming a ridge 64 protruding radially outwardly from the axis 58 of the stem.

Referring now to the valve shield 44 in detail, the valve shield 44 is provided for retaining the resilient member 48 and for preventing the resilient member 48 from damaging the front side 54 of the check valve 42, for example by preventing the resilient member 48 from digging into the front side 54 of the body 50 of the check valve 42. To accomplish the foregoing, the valve shield 44 may be coupled to the check valve 42 and be made of any suitable material, such as a suitable metal, such as titanium.

The valve shield 44 has a first portion 70 having a backside 72 for abutting the front side 54 of the body 50 and a front side 74 that serves as a seat for a resilient member 48. The valve shield 44 also has a second portion 76 that projects from the first portion 70 along a central axis so as to be perpendicular to the front side 74. An opening 78 is provided through the first and second portions 70 and 76 that surrounds the stem 56 when the valve shield 44 is coupled to the check valve 42. The valve shield 44 is retained on the stem 56 between the front side 54 of the body 50 and the distal end 62 of the at least one radially inwardly deflectable member 60 by the radially outwardly projecting catch 64. In other words, the valve shield includes a central aperture 78 received about the stem 56 and retained between the ridge 64 of the prongs 60 and the front side 54 of the body 50.

The first and second portions 70 and 76 may both be substantially cylindrical, and have a combined axial length that is less than an axial length of the stem 56. In an embodiment, the valve shield 44 does not extend beyond the distal end 62 of the radially inwardly deflectable members 60, and in particular, does not extend beyond the radially outwardly projecting catches 64 of the radially inwardly deflectable members 60. The valve shield 44 may be sized such that a gap is be provided between a distal end of the second portion 76 and the radially outwardly projecting catches 64 when the valve shield 44 and check valve 42 are coupled together.

To assembly the check valve assembly 40, the backside 72 of the valve shield 44 is advanced towards the front side 54 of the body 50 of the check valve 42 until the opening 78 in the valve shield 44 is aligned with the stem 56 of the check valve 42. The valve shield 44 is then advanced over the stem 56, thereby urging the radially inwardly deflectable members 60 radially inwardly. The spacing between the radially inwardly deflectable members 60 allows the radially inwardly deflectable members 60 to be compressed together as the valve shield 44 is advanced over the stem 56.

The valve shield 44 is then advanced towards the front side 54 of the body 50 until the second portion 76 of the valve shield 44 has passed the radially outwardly projecting catches 64 and the first and second portions 70 and 76 surround the unsegmented portion 68 of the stem 56. Once the valve shield 44 has passed the radially outwardly projecting catches 64, the radially outwardly projecting catches 64 snap radially outwardly to their original positions to hold the valve shield 44 between the front side 54 of the body 50 and the distal end 62 of the radially inwardly deflectable members 60. When the check valve assembly 40 is installed in the manifold 12, the force of the resilient member 48 will cause the backside 72 of the valve shield 44 to abut the front side 54 of the check valve 42.

The width of the stem 56 at the distal end 62, and in particular the width of the radially outwardly projecting catches 64 is greater than an inner width of the second portion 76 of the valve shield 44, and in particular an inner diameter of the second portion 76, to prevent the valve shield 44 from moving past the radially outwardly projecting catch 64 when assembled. In this way, a press fit mechanical bond is provided between the check valve 42 and the valve shield 44.

By providing a mechanical bond between the check valve 42 and the valve shield 44, the valve shield 44 is not coupled to the check valve 42 by an adhesive that holds the check valve and valve shield together. The mechanical bond thereby eliminates the need to clean the front side 54 of the body 50 of the check valve 42 to remove contaminates and the need to apply adhesive to the front side 54 of the body 50 to secure the valve shield 44 to the check valve 42. Thus, assembly time is reduced by the mechanical bond. Additionally, an adhesive bond deteriorates, for example in water environments, whereas the mechanical bond between the check valve 42 and valve shield 44 does not deteriorate.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A check valve assembly comprising:
   a check valve having:
      a body having a first side configured to abut a valve seat and a second side; and
      a stem projecting from the second side of the body and having at least two circumferentially spaced members, at least one of which is a radially inwardly deflectable member having a distal end having a radially outwardly projecting catch; and
   a valve shield having a first side for abutting the second side of the body, a second side configured to serve as a seat for a resilient member, and an opening configured to surround the stem,
   wherein the valve shield is configured to be retained on the stem between the second side of the body and the distal end of the at least one radially inwardly deflectable member by the radially outwardly projecting catch,
   wherein the radially inwardly deflectable member is urged radially inwardly by the valve shield until the valve shield moves to a position allowing the radially outwardly projecting catch to snap radially outwardly to hold the shield between the second side of the body and the distal end of the at least one radially inwardly deflectable member.

2. The check valve assembly according to claim 1, wherein the valve shield does not extend beyond the distal end of the radially inwardly deflectable member.

3. The check valve assembly according to claim 2, wherein the valve shield does not extend beyond the radially outwardly projecting catch.

4. The check valve assembly according to claim 1, wherein the valve shield includes a first portion that abuts the second side of the body and a second portion projecting from the first portion along the stem defining the opening.

5. The check valve assembly according to claim 1, wherein the stem is cylindrical and the at least two circumferentially spaced members are curved.

6. The check valve assembly according to claim 1, wherein the check valve is made of nylon and the valve shield is made of metal.

7. The check valve according to claim 6, wherein the valve shield is made of titanium.

8. The check valve assembly according to claim 1, wherein the stem is segmented longitudinally into the at least two circumferentially spaced members.

9. The check valve assembly according to claim 1, wherein the stem includes an unsegmented portion and a segmented portion formed by the at least two circumferentially spaced fingers.

10. The check valve assembly according to claim 1, wherein the stem includes at least two radially inwardly deflectable members.

11. The check valve assembly according to claim 1, wherein the stem includes at least three radially inwardly deflectable members.

12. A valve assembly comprising:
   a valve housing with a passage;
   a check valve assembly in the passage, the check valve assembly including:
      a check valve having a body having a first side and a second side configured to abut a valve seat in the housing and a stem projecting from the first side of the body, the stem having at least two circumferentially spaced members, at least one of which is a radially inwardly deflectable member having a distal end having a radially outwardly projecting catch; and
      a valve shield having an opening surrounding the stem and being retained on the stem between the first side of the body and the distal end of the at least one radially inwardly deflectable member by the radially outwardly projecting catch;
   a resilient member having a first end seated on the valve shield and a second end seated on a surface opposite the valve shield; and
   a valve plug for closing the passage, and
   wherein the second end of the resilient member is seated on the valve plug.

13. The valve assembly according to claim 12, wherein the valve plug has a body and a check valve guiding member projecting from the body, and wherein the check valve body is telescopically movable relative to the check valve guiding member.

14. The valve assembly according to claim 13, wherein the check valve guiding member is received in a cavity in the stem.

15. The valve according to claim 12, further including a seal that seals between the valve housing and the valve plug.

16. A valve assembly, comprising:
- a valve having a side and a stem circumscribing a central axis, the stem extending from the side of the valve and being segmented longitudinally into a plurality of separate prongs, at least one of the prongs having a narrow first end at a base and a radially broader end remote from the base forming a ridge protruding radially outwardly from the axis of the stem; and
- a valve shield having a central aperture received about the stem and being retained between the ridge of the prongs and the side of the valve; and
- wherein each ridge is tapered radially inwardly going in a direction away from the side of the valve, whereby a sloped surface is provided to facilitate insertion of the ridge through the central aperture of the valve shield during assembly of the valve assembly.

17. The check valve according to claim 16, wherein the valve shield does not extend beyond the radially broader end of the prong.

18. A check valve assembly comprising:
- a check valve having:
  - a body having a first side configured to abut a valve seat and a second side; and
  - a stem projecting from the second side of the body and having at least two circumferentially spaced members, at least one of which is a radially inwardly deflectable member having a distal end having a radially outwardly projecting catch; and
- a valve shield having a first side for abutting the second side of the body, a second side configured to serve as a seat for a resilient member, and an opening configured to surround the stem,
- wherein the valve shield is configured to be retained on the stem between the second side of the body and the distal end of the at least one radially inwardly deflectable member by the radially outwardly projecting catch, and
- wherein the check valve is made of nylon and the valve shield is made of metal.

19. The check valve according to claim 18, wherein the valve shield is made of titanium.

20. A valve assembly comprising:
- a valve housing with a passage;
- a check valve assembly in the passage, the check valve assembly including:
  - a check valve having a body having a first side and a second side configured to abut a valve seat in the housing and a stem projecting from the first side of the body, the stem having at least two circumferentially spaced members, at least one of which is a radially inwardly deflectable member having a distal end having a radially outwardly projecting catch; and
  - a valve shield having an opening surrounding the stem and being retained on the stem between the first side of the body and the distal end of the at least one radially inwardly deflectable member by the radially outwardly projecting catch; and
  - a resilient member having a first end seated on the valve shield and a second end seated on a surface opposite the valve shield; and
- a valve plug for closing the passage,
- wherein the valve plug has a body and a check valve guiding member projecting from the body, and wherein the check valve body is telescopically movable relative to the check valve guiding member, and
- wherein the check valve guiding member is received in a cavity in the stem.

* * * * *